United States Patent [19]

Patil et al.

[11] 4,262,604
[45] Apr. 21, 1981

[54] RAILWAY CAR ROOF HATCH COVER LOCK

[75] Inventors: Babgaunda A. Patil, Birmingham, Ala.; Richard L. Tuck, Sr., Highland, Ind.; Dilip T. Naik, Birmingham, Ala.

[73] Assignee: Pullman Incorporated, Chicago, Ill.

[21] Appl. No.: 50,841

[22] Filed: Jun. 20, 1979

[51] Int. Cl.³ .................... B61D 39/00; B61D 17/16; E05B 65/18; E05C 3/16
[52] U.S. Cl. .................................. 105/377; 49/394; 105/308 A; 105/308 E; 220/314; 292/259 R
[58] Field of Search ............. 105/377, 308 A, 308 E; 292/256.5, 259 R; 49/394; 220/314

[56] References Cited
U.S. PATENT DOCUMENTS

| 2,433,084 | 12/1947 | Beauchamp | 105/377 |
| 2,816,683 | 12/1957 | Miers et al. | 220/314 |
| 3,041,099 | 6/1962 | Stewart et al. | 292/259 R |
| 3,217,661 | 11/1965 | Kemp | 105/377 |
| 3,800,714 | 4/1974 | Stark et al. | 105/377 |
| 3,934,518 | 1/1976 | Adler | 105/377 |
| 4,021,067 | 5/1977 | Nadherney | 105/377 X |

*Primary Examiner*—Howard Beltran
*Attorney, Agent, or Firm*—Stephen D. Geimer

[57] ABSTRACT

A mechanism for locking the lock straps of railway car hatch covers includes a pivoted lever which is clamped over the tongue of a lock strap. The clamping is achieved by means of a pivoted keeper member having a mouth portion engaging the ends of the lever in locking relation. The keeper member is pivotally supported and is positioned by an overcenter toggle action in a receiving or locked position by means of a leaf spring assembly. The locking and unlocking action may be accomplished by hand or foot operation.

18 Claims, 6 Drawing Figures

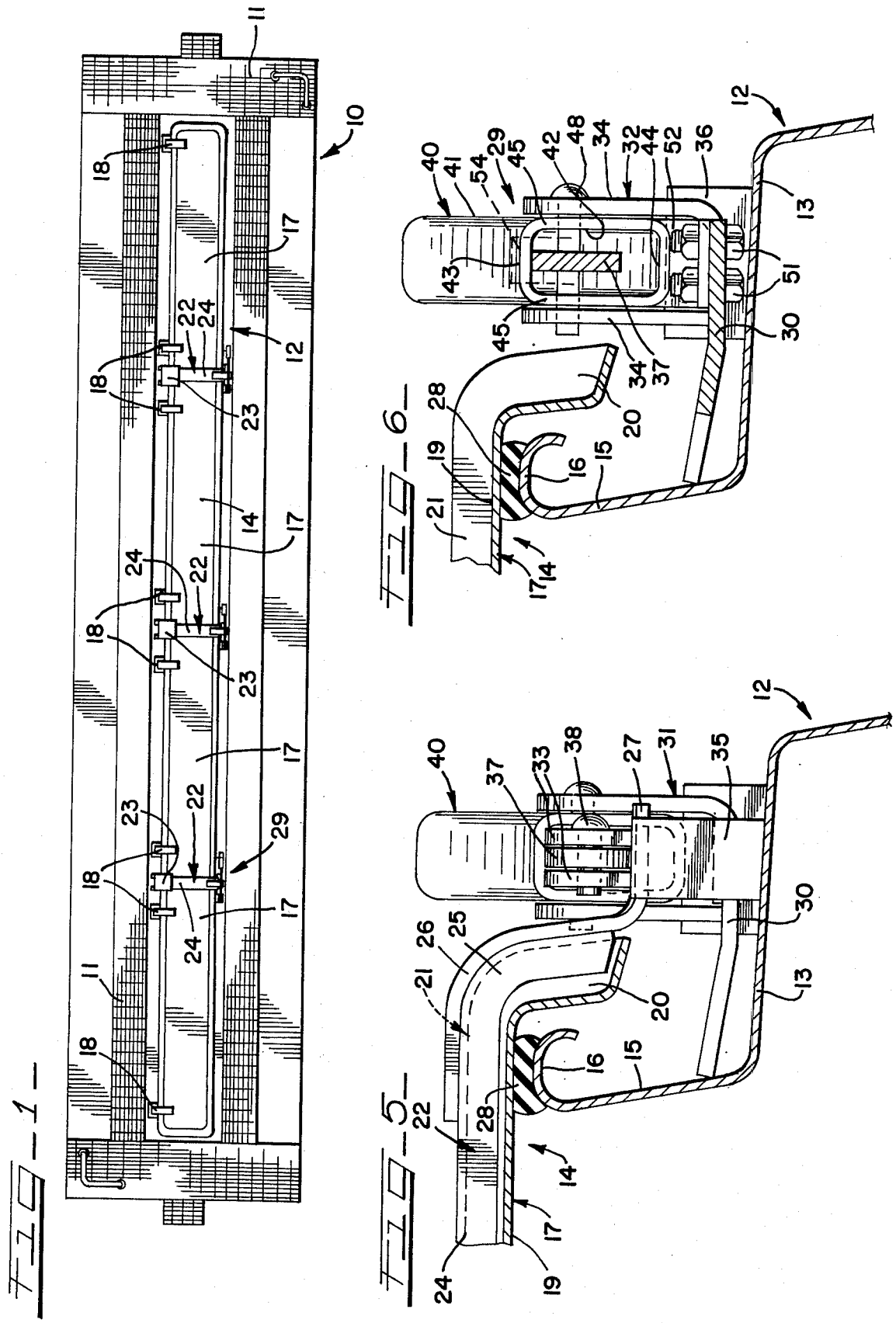

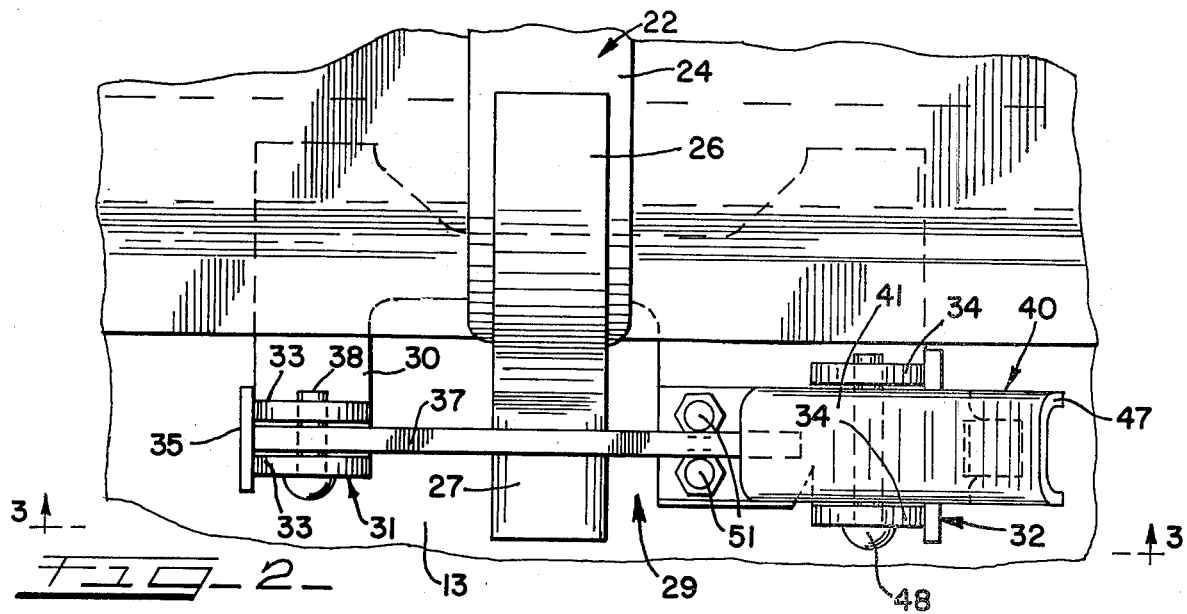
FIG_2
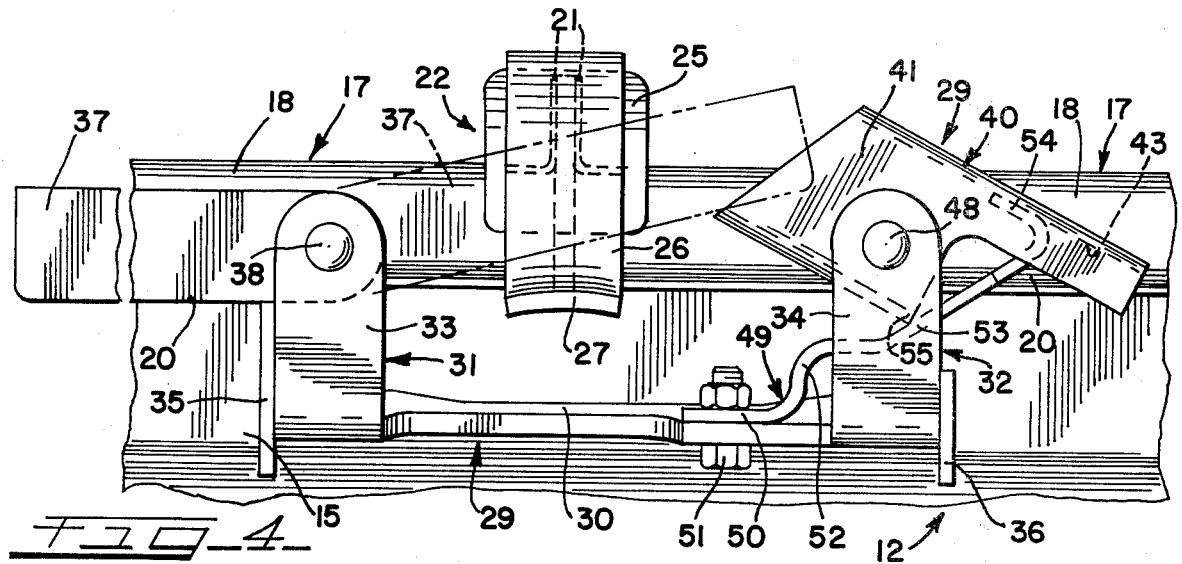
FIG_4
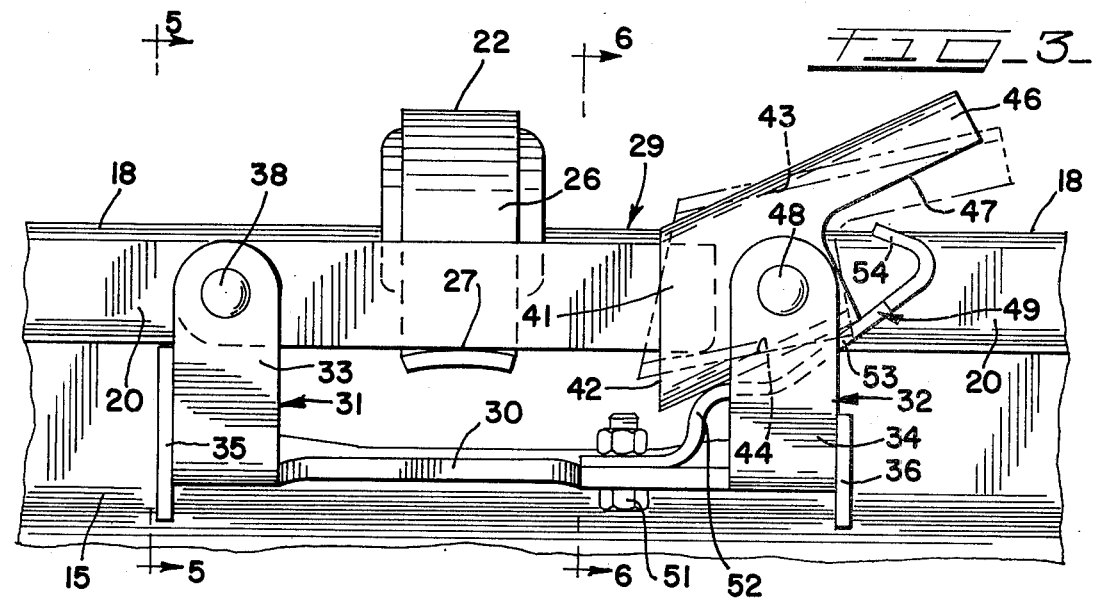
FIG_3

RAILWAY CAR ROOF HATCH COVER LOCK

BACKGROUND OF THE INVENTION

1. Field of the Invention

The present invention broadly is concerned with railway hopper cars having a closed roof construction with a hatch cover arrangement.

More specifically the present invention is concerned with an improved locking mechanism for locking the hatch covers of a hopper car.

2. Description of the Prior Art

The prior art illustrates various arrangements for maintaining hatch covers of railway hopper cars in a closed position. Typically, these arrangements include pivoted latch assemblies which engage a portion of the hatch cover to maintain same in closed relation to said hatch opening. The present invention improves upon these various prior art designs by providing a lever and keeper arrangement which is easily operable yet securely maintains the hatch cover in closed relation to the hatch opening.

SUMMARY OF THE INVENTION

The present invention relating to a locking mechanism for maintaining the hatch covers of a railway car in a closed position includes the utilization of conventional lock straps which are hingedly connected on one side of the hatch cover opening and during a closed position extend over and maintain adjacent vertical flanges of adjacent hatch covers in a locked and sealed position. The aforementioned prior art includes the strap arrangements which are described and include various mechanisms for holding the strap arrangements in a locked position thereby also maintaining locked relation of the hatch covers. In the present invention a novel mechanism for achieving the locking of the hinged locking straps is achieved by the utilization of a hinged lever hingedly connected to one side of the projecting tongue of one of the locking straps. The prior art discloses the levers and tongues of the locking straps and various mechanisms whereby the levers are secured over the tongues for securely locking the hatch covers in a closed position. In the present invention the improvement includes a novel keeper mechanism for retaining the said levers in the locked position.

The keeper mechanism of the present invention includes a pivoted lock member which is pivotally supported on a vertical pivot bracket positioned in spaced relation to one end of the locking lever of the assembly. The pivoted lock member includes a tubular body providing a tubular keeper portion which is adapted to receive the end of the locking lever in a partially engaged position and is also adapted to receive upon locking of the lock member the lever in a completely locked and linear position relative to the keeper member. The keeper member is positioned in a partially engaged position relative to the locking lever so that upon a downward pressure on the lever by means of the foot or the hand of the operator the locking lever and the keeper member are pivoted on the respective pivotal supports whereupon the locking lever is engaged in the socket of the keeper member in a linear position to lock the tongues, and the lock straps 22 in an engaged and locked position over the hatch openings.

The lock member and/or keeper member are positioned in a partially engaged position by the lever member by means of a leaf spring assembly which positions the parts in this particular relation. The leaf spring assembly, as may be occasioned by downward force applied by the operator on the lever, provides for pivoting movement of the lever and the lock member into engagement with the mouth or socket of the keeper whereupon the spring assembly is effective to urge the said members to a substantially linear lock position and maintains the same in this position during transit. The lock member also includes an actuating or handle portion 46 at one end which again can be actuated by the foot of an operator to again pivot the keeper member 41 to a disengaging position whereupon the lever 37 may be moved upwardly out of engagement with the tongue 27 thereupon permitting the hatch cover to be moved into an open position. The leaf spring assembly is such that it will resiliently maintain the locking member in a lever engaging position and will upon rotation of the same, urge the said lock member into the locked position as desired.

BRIEF DESCRIPTION OF THE DRAWINGS

FIG. 1 is a plan view of a railway hopper car roof construction;

FIG. 2 is a plan view of a portion of a railway car roof hatch cover with an improved locking mechanism;

FIG. 3 is a side elevational view of the locking mechanism taken along line 3—3 of FIG. 2 with the locking mechanism and hatch cover in a locked position;

FIG. 4 is a side elevational view of the locking mechanism shown in FIG. 3 with the mechanism in an unlocked position relative to a roof cover and associated structure;

FIG. 5 is a cross-sectional view taken substantially along the line 5—5 of FIG. 3; and FIG. 6 is a cross-sectional view taken along the line 6—6 of FIG. 3.

DESCRIPTION OF THE PREFERRED EMBODIMENT

Referring to FIG. 1 a hopper car roof construction 10 includes at its upper surface a plurality of grated walkways 11 permitting the operator's access to the various portions of the roof of the hopper car. The present hopper car is of the closed top type including elongated hatch covers which are provided to close an elongated hatch. The roof construction 10 includes roof sheathing 12 providing a hatch frame 13 on the car roof construction 10. The hatch frame 13 comprises an elongated hatch opening 14 which is formed by vertically extending hatch coaming 15 completely coextensive with the hatch opening 14. The hatch coaming at its upper end is also provided with a coextensive beaded portion 16. Closing of the hatch openings is provided by means of a plurality of elongated hatch covers 17 which are hingedly mounted by hinge structures 18 to one side of the hatch coaming 15 on the hatch frame 13. Each hatch cover 17 includes a hatch plate portion 19 provided with downwardly extending flanges 20. As best shown in FIG. 4 the elongated hatch covers 17 are formed in individual sections and include at adjacent ends upwardly extending flanges 21. The ends of the hatch covers which are adjacent to each other are firmly locked in a closed position by means of hinged lock straps 22 of channel-shaped construction which conventionally extend over the upwardly extending flanges 21 and provide for sealing of the adjacent edges of each of the hatch covers. Each of the lock straps 22 is hinged as indicated at 23 and includes horizontal central portions 24 and downwardly extending flanges 25. The flanges 25 overlie the downwardly extending flanges 20 as best shown in FIGS. 5 and 6. Each of the lock straps 22 include at their upper outward ends curved plate straps 26 secured to the lock straps 22 and projecting downwardly with the downwardly extending flanges 25 and then projecting outwardly to provide tongues 27. As best shown in FIGS. 5 and 6 a seal element 28 is firmly connected to either the elongated hatch cover 17 or to the bead 16 extending coextensively therewith to form an effective seal about the peripheral extension of the elongated opening 14 of the hatch.

Referring now particularly to FIGS. 2, 3 and 4 a locking mechanism 29 includes a base plate 30 suitably connected to a hatch frame 13. The base plate 30 includes an upwardly extending bracket 31 and another upwardly extending bracket 32 spaced longitudinally therefrom. Each of the brackets 31 and 32 comprise spaced vertical plates 33 and 34 which are suitably connected to the base plate 30 by means of vertical gussets 35 and 36. The bracket 31 has mounted for pivotal movement thereon a lever 37 which extends between the brackets 31 and 32 but is of a length slightly shorter than the dimension between said brackets. The lever 37 is pivoted by means of a pivot 38 on the bracket 31. A pivoted lock member is generally designated by the reference character 40 and includes a cylindrical mouth or socket 42 which as best shown in FIGS. 5 and 6, include an upper wall 43, a lower wall 44 and connecting side walls 45. The keeper member includes an extension providing an actuating or handle portion 46 which is formed by a cut-out portion providing the arcuate end 47 as best shown in FIG. 2. The keeper member 41 is pivoted by means of a pivot pin 48 on the bracket 32. The leaf spring assembly 49 is supported to position the keeper member by an overcenter toggle action in a plurality of different positions. The assembly 49 includes an anchor portion 50 secured to the base portion 30 by means of bolts and nuts 51. The spring assembly 49 further includes a curved spring portion 52 connected to a diagonal spring portion 53 in turn connected to a narrow flange or stop portion 54. One end of the lower wall 44 is designated as a corner portion 55 which in the position shown on FIG. 2 engages the diagonal portion 53 of the spring assembly.

The leaf spring assembly and its positioning of the lock member 40 relative to the lever is of course exceedingly important in the present invention. Therefore, in order to define the various positions, the locking position as shown in FIG. 3 discloses first spring portions which are designated at 52 which is the curved spring end, and the diagonal portion 53 which in the lock position, shown in FIG. 3, are disposed on opposite sides of the pivot 48.

In the unlocked position the second spring portions are the diagonal portion 53 and the stop 54 which in the unlocked position are disposed to one side of the pivot means 48.

OPERATION

In the open position shown in FIG. 4 wherein the lever 37 is moved to a counter-clockwise position the hatch covers may be merely moved upwardly hinged about their hinged portions and laid to one side of the hatch cover openings on the roof sheathing of the hopper car. In order to close the hatch covers into the position shown in FIG. 3 the operator merely swings the lever 37 from the full line position shown in FIG. 4 over into the partial engagement of the keeper as shown in FIG. 4. In this position the keeper 41 or pivoted lock 40 is disposed in a diagonal position wherein the end corner 55 of the bottom wall 44 is in engagement with the diagonal portion 53 of the spring arrangement 49. The diagonal spring portion 53, by virtue of the flange or stop portion 54, exerts a force against the wall 43 to maintain the pivot lock member 40 in the position indicated whereupon it partially receives the end of the lever 37. The operator now in order to effectively lock the lever and the keeper member in the locked position merely places his foot on top of the lever 37 and on the pivotal lock member 40 pressing downwardly whereupon the lever 37 and the lock member 40 are pivoted to the position shown in FIG. 3 where they are in interengaged and lock relation. Since the lever 37 has now engaged the tongue 27 in locking relation the hatch covers are locked. In this position the lock member 40 is therein retained, in the position of FIG. 3 by its engagement of the lower wall 44 with the curved spring portion 52 and the corner 55 which is positioned on a portion of the diagonal spring member 53. It is to be noted that the first spring portions in this position are 52 in engagement with a portion of the wall 44 and the diagonal portion 53 being engaged by the corner 55 the said first portions being disposed on opposite sides of the pivot 48. In the open position as shown in FIG. 4 both the second spring portions 53 and 54 are disposed to one side of the pivot 48. When it is again desired to release the locking relation of the locking member 40 relative to the lever 37 the operator merely, by hand or by foot operation, steps on the actuating member or handle portion 46 forcing the same in a clockwise direction downwardly from the position shown in FIG. 3 to the position shown in FIG. 4 where again the lever 37 can be moved to the open position.

What is claimed is:
1. In a hatch construction including a frame having a hatch opening, a hatch cover hingedly connected to said frame for closing said opening
- a lock strap having one end portion hingedly connected to said frame and including a central portion engaging and overlying said cover in a locking position,
- said locking strap including a free end portion having a flat tongue projecting outwardly from said cover, an improved hatch locking mechanism comprising:
- a lever pivotally mounted on said frame and including a central portion thereof movable into a locking position engaging said tongue to maintain said cover in a lock position,
- a lock member movably mounted on said frame,
- said lock member having a portion thereof adapted to engage said lever in a locked position of said lock member to exert a downward locking force on said lever,
- and releasable spring means for directly biasing said lock member into said locked position to releasably maintain said lever in said locking position thereby securely maintaining said hatch cover in closed relation to said hatch opening.

2. The invention in accordance with claim 1,
said lock member having a horizontal wall portion thereof projecting over and engaging an end portion of said lever.

3. The invention in accordance with claim 1, wherein said lock member is movable to an unlocked position wherein said portion is disengageable from said lever and said lever is movable to an unlocking position relative to said tongue of said locking strap.

4. The invention in accordance with claim 3, wherein said spring means includes a first spring portion engageable with said lock member for urging said lock member toward said unlocked position, and a second spring portion engageable with said lock member for urging said lock member toward said locked position.

5. The invention in accordance with claim 4, wherein said releasable spring means further includes stop means for limiting movement of said lock member between said unlocked and locked positions.

6. The invention in accordance with claim 3, wherein said lock member includes a further portion engageable by said lever in the unlocked position of said lock member whereby movement of said lever into said locking position moves said lock member into said locked position.

7. The invention in accordance with claim 6, wherein said lock member comprises a tubular member pivotally mounted on said frame, said member having a upper wall including said portion adapted to engage said lever in the locked position of said lock member, and said tubular member further having a lower wall including said further portion engageable by said lever in the unlocked position of said lock member.

8. The invention in accordance with claim 7, wherein said tubular member further includes a corner portion engaged by said releasable spring means for biasing said lock member.

9. The invention in accordance with claim 8, wherein said spring means comprise a leaf spring having a first spring portion for urging said lock member into said unlocked position and a second spring portion for urging said lock member into said locked position.

10. The invention in accordance with claim 8, wherein said tubular member includes actuating means spaced from said portion for pivotally moving said lock member.

11. In a hatch construction including a frame having a hatch opening, a hatch cover hingedly connected to said frame for closing said opening,
a lock strap having one end portion hingedly connected to said frame and including a central portion engaging and overlying said cover in a locking position,
said locking strap including a free end portion having a flat tongue projecting outwardly from said cover, an improved hatch locking mechanism comprising:
a lever pivotally mounted on said frame and including a central portion therof movable into a locking position engaging said tongue to maintain said cover in a lock position,
a lock member movably mounted on said frame,
said lock member having a portion thereof adapted to engage said lever in a locked position of said lock member to exert a downward locking force on said lever,
releasable spring means constructed and arranged to releasably maintain said lever and said lock member in said lock position,
said lock member including pivot means on said frame and having at one end to one side of said pivot means a keeper portion engageable with said lever;
said lock member including at its other end an actuating portion disposed on the other side of said pivot means,
said spring means including first spring portions engaging said lock member to maintain the same in a unlocked position, and
said spring means including second spring portions engaging said lock member to maintain the same in said locked position.

12. The invention in accordance with claim 11, said first spring portion being disposed to one side of said pivot means, and
said second spring portions being disposed on opposite sides of said pivot means.

13. The invention in accordance with claim 11, said spring means comprising a leaf spring.

14. The invention in accordance with claim 11, said keeper portion comprising a socket adapted to receive the end of said lever in mating relation.

15. The invention in accordance with claim 11, said pivot means including a bracket on said frame spaced to one side of the end of said lever,
a pivot element supporting said lock member between said keeper portion and said actuating portion,
said first spring portion being positioned to one side of said pivot element, and
said second spring portion being disposed on opposite sides of said pivot means.

16. The invention in accordance with claim 15, said keeper portion including engagable means during pivotal movement of said lever and keeper portion engaging the end of said lever in interlocking relation.

17. The invention in accordance with claim 11, said spring means comprising a leaf spring connected to said frame,
said spring having said first spring portion being disposed on one side of said pivot means, and said second portion extending to the other side of said pivot means,
a stop on said second spring portion engaging said actuating portion to resiliently position the same in partial engagement with said lever, and
said spring being resiliently deformable during a downward force on the end of said lever to permit interengagement of said lever and said keeper portion to a lock position, whereupon said second spring portions maintain said lock member in said locked position.

18. The invention in accordance with claim 17, said actuating portion during a downward force being pivoted to a disengaging position with respect pg,19 to said lever whereupon said keeper portion and lever assume said partially engaged position whereupon said lever may be moved to an open position.

* * * * *